US008672007B2

(12) United States Patent
Dahlhaus-Preussler et al.

(10) Patent No.: US 8,672,007 B2
(45) Date of Patent: Mar. 18, 2014

(54) SEALING ARRANGEMENT BETWEEN A STATIONARY FIRST MACHINE PART AND A SECOND MACHINE PART THAT ROTATES AROUND THE FIRST MACHINE PART

(75) Inventors: Ulrich Dahlhaus-Preussler, Edingen-Neckarhausen (DE); Massimo Barban, Campiglione Fenile (IT)

(73) Assignee: Carl Freudenberg KG, Weinheim (DE)

( * ) Notice: Subject to any disclaimer, the term of this patent is extended or adjusted under 35 U.S.C. 154(b) by 169 days.

(21) Appl. No.: 13/022,773

(22) Filed: Feb. 8, 2011

(65) Prior Publication Data

US 2011/0193295 A1 Aug. 11, 2011

(30) Foreign Application Priority Data

Feb. 9, 2010 (EP) .................................... 10001292

(51) Int. Cl.
*B60C 23/10* (2006.01)
*F16J 15/32* (2006.01)

(52) U.S. Cl.
USPC .......................................... 152/415; 277/551

(58) Field of Classification Search
USPC ............... 277/551, 552, 563, 353; 301/105.1, 301/109, 110, 111.01, 111.03, 126; 152/415, 417
See application file for complete search history.

(56) References Cited

U.S. PATENT DOCUMENTS 4,421,326 A * 12/1983 Drygalski ..................... 277/552
4,431,043 A * 2/1984 Goodell et al. ............... 152/417
4,844,255 A 7/1989 Schmitt
5,080,157 A * 1/1992 Oerter ........................... 152/417
6,575,269 B1 * 6/2003 Skoff et al. ..................... 184/5.1
6,857,457 B2 * 2/2005 Nienhaus ....................... 152/417
7,004,471 B2 * 2/2006 Bryde et al. .................. 277/318
7,090,223 B2 * 8/2006 Reinhard ....................... 277/551
7,530,870 B2 * 5/2009 Kishimoto et al. ........... 440/112
2001/0051237 A1 * 12/2001 Gust ............................ 428/34.1
2002/0089124 A1 * 7/2002 Hosokawa et al. ........... 277/551
2002/0112802 A1 8/2002 D Amico
2007/0222157 A1 * 9/2007 Kondo et al. ................. 277/345

FOREIGN PATENT DOCUMENTS

CN 1954149 A 4/2007
DE 2351767 A1 4/1975
DE 3619309 C1 9/1987
DE 19834065 A1 2/1999
DE 20101327 U1 6/2002
GB 1476662 A 6/1977
JP S6338768 A 2/1988
WO 2007/109818 A1 10/2007
WO WO 2007109818 A1 * 10/2007
WO WO 2008126487 A1 * 10/2008

* cited by examiner

*Primary Examiner* — Vishal Patel
*Assistant Examiner* — Stacy Warren
(74) *Attorney, Agent, or Firm* — Leydig, Voit & Mayer, Ltd.

(57) ABSTRACT

A sealing arrangement includes a stationary first machine part configured as an axle stub including at least one axial inflow hole adjoining with at least one opening that faces towards an outside surface of the axle stub in a radial direction of the axle stub. A second machine part configured as a container includes a hub rotatably surrounding the axle stub. The hub includes at least one opening that corresponds to the at least one opening of the axle stub in the radial direction so as to form one or more pairs of adjacent openings along an axial direction. A radial seal is disposed between each pair of adjacent openings.

20 Claims, 4 Drawing Sheets

SEALING ARRANGEMENT BETWEEN A STATIONARY FIRST MACHINE PART AND A SECOND MACHINE PART THAT ROTATES AROUND THE FIRST MACHINE PART

CROSS-REFERENCE TO PRIOR APPLICATIONS

Priority is claimed to European Patent Application No. EP 10 001 292.1, filed on Feb. 9, 2010, the entire disclosure of which is hereby incorporated by reference herein.

FIELD

The present invention relates to a sealing arrangement between a stationary first machine part and a second machine part that rotates around the first machine.

BACKGROUND

In the technical realm, there is often a need for the interior of a housing having a shaft inserted into the housing wall to be sealed with respect to the outside. For this purpose, radial shaft seals are inserted into the annular gap between the housing wall and the shaft. The seal prevents lubricants from escaping from the interior of the housing and also protects the interior against the penetration of dirt particles from the outside. In addition, there is also the aspect of providing a sealing arrangement for fluids that do not contain any lubricant fractions such as, for example, water.

SUMMARY

In an embodiment, the present invention provides a sealing arrangement between a stationary first machine part and a second machine part that rotates around the first machine part. A stationary first machine part configured as an axle stub includes at least one axial inflow hole adjoining with at least one opening that faces towards an outside surface of the axle stub in a radial direction of the axle stub. A second machine part configured as a container includes a hub rotatably surrounding the axle stub. The hub includes at least one opening that corresponds to the at least one opening of the axle stub in the radial direction so as to form one or more pairs of adjacent openings along an axial direction. A radial seal is disposed between each pair of adjacent openings.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
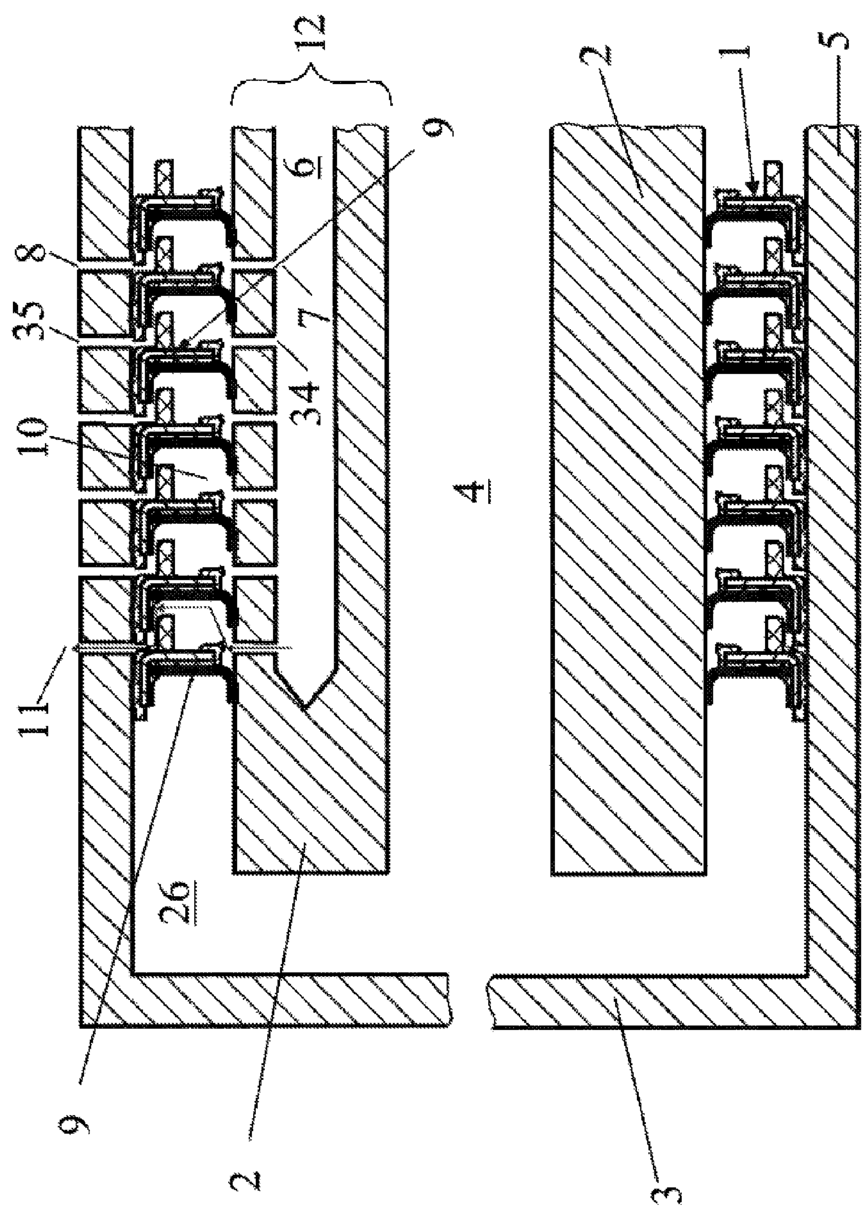
FIG. 1 is a schematic view of a sealing arrangement according to an embodiment of the present invention in a longitudinal section.

In an embodiment, the present invention provides a sealing arrangement for sealing two machine parts in which both machine parts have interiors that are in fluid communication with each other. An aspect of the present invention is to establish this fluid communication, to maintain the mobility of the machine parts with respect to each other and to ensure proper sealing with respect to the environment.

In order to obtain a properly sealed fluid communication between a stationary first machine part and the second machine part that rotates around the first machine part, the stationary first machine part is configured as an axle stub while the second machine part that rotates around this axle stub is configured as a container. Here, the interior of the axle stub is in fluid communication with the interior of the container via at least one hole leading to the outside and having the opening created in the container wall that surrounds the axle stub. Here, radial seals are arranged between the individual flow paths of the fluid. The interior of the container is normally filled via the interior of the axle stub and via the openings present in the axle stub and in the housing wall. Preferably, the container is provided with a hub that encircles the axle stub. The fluid is then fed into the annular space between the axle stub and the hub, said annular space being sealed by the radial seals.

The openings present in the axle stub are oriented radially and they open up into the interstices between the radial seals. The openings are made by drilling and can be distributed in several rows along the circumference of the axle stub. The container wall or the hub is likewise provided with openings whose number matches the number of openings in the axle stub and which preferably run radially in the same direction as the openings in the axle stub. The openings facing each other are laterally enclosed by radial seals so that an interstice is created that is enclosed by the radial seals between the openings in the axle stub and in the container wall or hub.

The radial seals preferably comprise a static seal, which is made of elastomeric material and lies firmly against the container wall, and a dynamic seal, which is made of a polytetrafluoroethylene (PTFE) compound and lies against the axle stub so as to slide on it. Such a sealing arrangement has the advantage that the dynamic seal does not require any lubricant, but rather, can also be used for fluids during so-called dry-running. However, in the case that the fluid should also contain lubricant fractions, the dynamic seal can also be made of an elastomeric material.

The radial seals are fitted with metallic support elements that are configured so as to be L-shaped and that consist of an annular element that supports the static seal, and of an integrally adjoining, disk-shaped flange that supports the dynamic seal. In a preferred embodiment, the radial seals are fitted with axially projecting ring segments that grasp below the static seal on the annular element and that can be inserted into the annular element with a positive fit or with a press fit. Any desired number of radial seals thus configured are joined together to form a module, greatly simplifying the assembly procedure.

It is likewise advantageous if the disk-shaped flange of the support element is also sheathed by the elastomeric material that is used for the static seal. This measure protects the support elements against erosion. Moreover, the use of PTFE seals promotes adhesion of the dynamic PTFE seal to the elastomeric material that is used for the static seal. In order to allow a proper passage of the fluid into the container even when ring segments are employed, if the static seal is covered by the ring segment on the radially inner surface, the covering is provided at regular intervals along the circumference with flow channels that open up into round channels that have been created on the outer surface of the seal and that surround the seal. These round channels are formed by recesses made on the parts of the outer surfaces of the static seal that adjoin each other.

FIG. 1 shows a longitudinal section through a sealing module 1 that is arranged between the stationary hub 5 and the container 3 that surrounds the hub 5.

The axle stub 2 shown in FIG. 1 has a central passage 4 that can accommodate, for instance, a drive shaft for the container 3. The container 3 is provided with a hub 5 that surrounds the axle stub 2. The axle stub 2 has the axial inflow hole 6 extending in an axial direction. The axial inflow hole 6 has the inner openings 7 facing towards the outside in a radial direction. In the present case, the same total number of openings 8 is provided in the hub 5 of the container 3. In the present example, six openings have been made in the axle stub 2 and in the hub 5. The number of inner openings 7 is a function of the desired throughput volumes for the fluid in question. In each case, one inner opening 7 in the axle stub 2 corresponds to one opening 8 in the hub 5. The appertaining inner and outer openings 7 and 8 are positioned radially in pairs in approximately the same direction. The radial seals 9 separate the appertaining pair of inner and outer openings 7, 8 and the adjacent pair of inner and outer openings 34, 35 from each other. The course of the flow from the inflow hole 6 via an inner opening 7, the interstice 10, between two seals 9 and an outer opening 8 is indicated by the line extending in a radial direction 11 near the outer drilled inner and outer openings 7 and 8 on the left-hand side. The inflow hole 6 has been created in the wall 12 of the axle stub 2. In the example shown, the wall 12 includes only one inflow hole 6. In other embodiments, several inflow holes 6 with the appertaining inner openings 7 can be created in the wall 12. The same also applies to the openings 8 in the hub 5.

Figure 2:
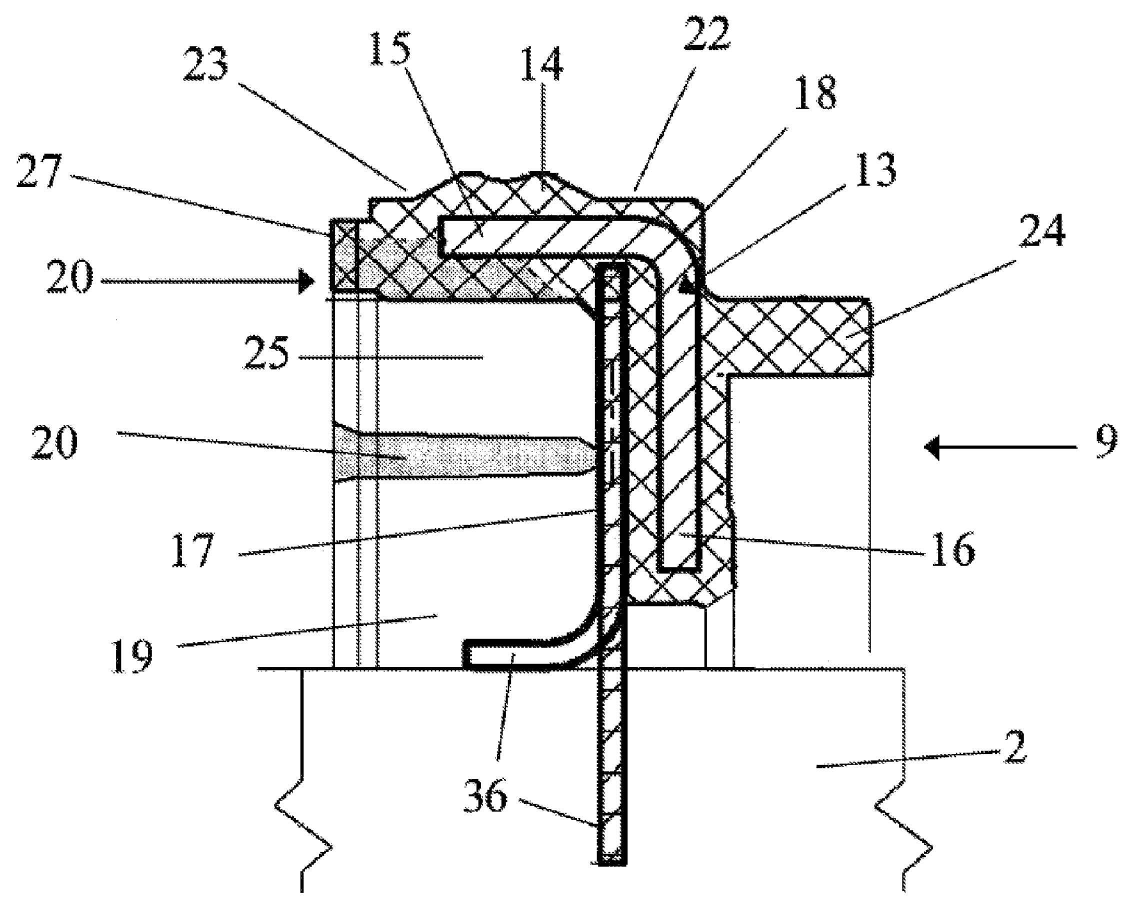
FIG. 2 shows an individual radial seal in a cross section.

FIG. 2 shows an enlarged view of the embodiment of the radial seals 9. The radial seal 9 consists of a metallic support element 13, which is L-shaped, and of an annular portion 15 that supports the static seal 14, and of a disk-shaped flange 16. The support element 13 is completely sheathed by the material of the static seal 14. The dynamic seal 17 is installed on the inside of the seal 9. The dynamic seal 17 is made of a PTFE compound and has a disk-shaped configuration. The seal 17 is glued onto the part of the static seal 14 that is present on the flange 16. At the same time, the radially external end of the seal 17 is inserted into a bead 18 on the static seal 14. As a result, the seal 17 is firmly joined to the radial seal 9. After the radial seal 9 has been produced, the sealing lip 36 protrudes radially inwards. Once the radial seal 9 had been inserted into the sealing gap 26, the sealing lip 36 is bent and lies flat against the axle stub 2. The material of the static seal 14 covers the annular portion 15 of the support element 13 on its radially inner surface. This covering 19 is provided with flow channels 20 that are distributed at regular intervals along its circumference and that open up into round channels 21 created on the outer surface of the static seal 14 and surrounding the radial seal. These round channels 21 are formed by the recesses 22 and 23 on the parts of the outer surfaces of the static seal 14 that adjoin each other. The radial seal 9 is fitted with axially projecting ring segments 24 that are inserted with a press fit in the interior 25 of an adjacent radial seal 9. The outer diameter of the ring segment 24 and the inner diameter of the covering 19 are coordinated with each other in such a way that the individual radial seals 9 can be connected to each other by means of a press fit. In this manner, several individual radial seals 9 are combined to form a module 1 which, as shown in FIG. 1, is inserted into the gap 26 between the axle stub 2 and the hub 5. Such a module 1 considerably facilitates the assembly of the individual parts 9. In this context, the distances between the individual radial seals 9 are coordinated with the inner openings 7 and outer openings 8 in the axle stub 2 or in the hub 5. This is supported by the buffer 27 of the individual radial seals 9 that come to rest against the closest seal 9 when the radial seals 9 are joined together. At the same time, these buffers leave an opening for the fluid flow.

Figure 3:
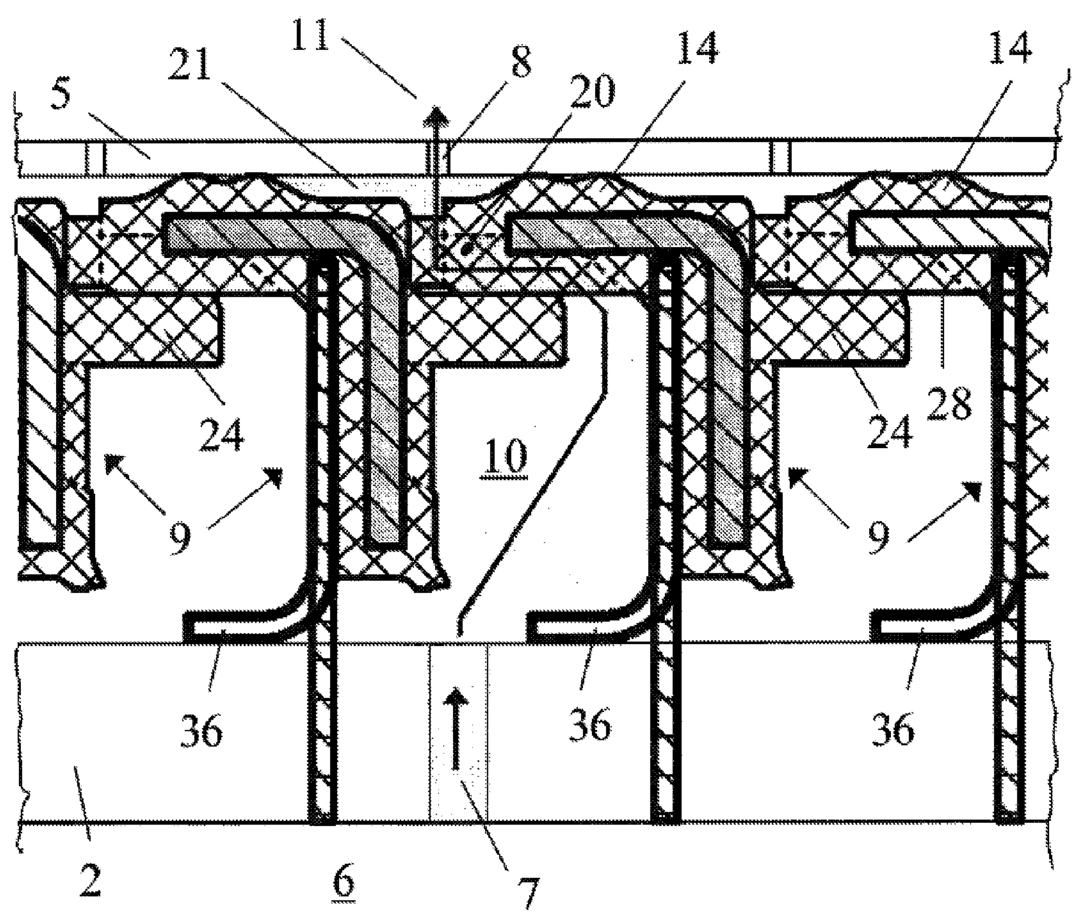
FIG. 3 shows a section of the upper part of FIG. 1, in an enlarged view.

FIG. 3 shows an enlarged view of the assembly of several radial seals 9. The static seals 14 are pressed into the hub 5 and they hold the radial seals 9 in place. Here, the radial seals 9 have been combined to form a module 1. The sealing lips 36 lie against the wall of the axle stub 2. As indicated by the solid line and by the arrows extending in the radial direction 11, the fluid flows out of the inflow hole 6 through the inner opening 7 in the axle stub 2, through the interstice 10, through the flow channel 20 and through the opening 8 in the hub 5 and into the container 3. The individual radial seals 9 are joined to each other by means of a press fit via the ring segments 24 and the bottom 28 of the static seal 14 to form a module 1.

Figure 4:
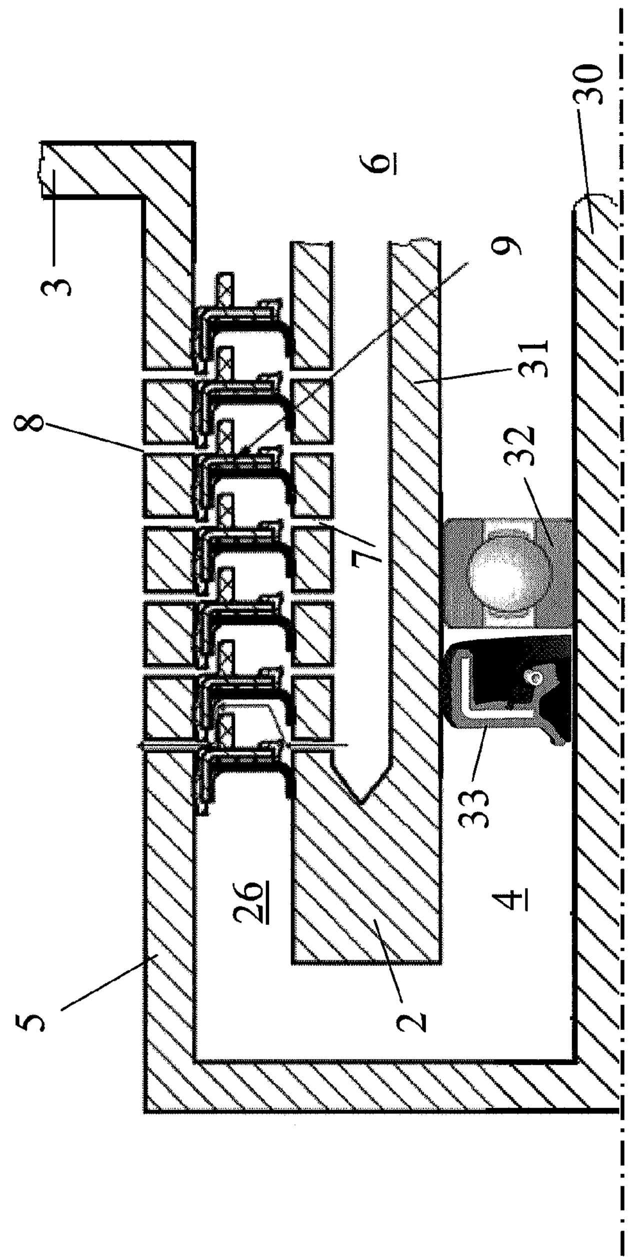
FIG. 4 shows a longitudinal section through the sealing arrangement, with an indication of a bearing for the shaft for the drive of the container.

FIG. 4 schematically shows an embodiment in which the container 3 is connected to the drive shaft 30. A ball bearing 32 with a corresponding radial seal 33 can be inserted between the drive shaft 30 and the inner wall 31 of the axle stub 2, whereby, in this case, the radial seal 33 has a static seal as well as a dynamic seal made of an elastomeric material.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

An embodiment of the invention provides a sealing arrangement between a stationary first machine part and a second machine part that rotates around the first one, characterized in that the stationary first machine part is configured as an axle stub (2) while the second machine part that rotates around this axle stub (2) is a container (3), whereby the axle stub (2) has at least one axial inflow hole (6) that adjoins at least one inner opening (7) facing radially towards the outside, and the container (3) has a hub (5) that surrounds the axle stub (2) and that has the same number of outer openings (8) correspond in pairs to the inner openings (7) of the axle stub (2), whereby the individually corresponding inner and outer openings (7, 8) are each separated from adjacent inner and outer openings (34, 35) by radial seals (9).

The sealing arrangement is preferably one in which the inflow hole (6) is a blind hole. It may also be one in which the inner openings (7) present in the axle stub (2) are oriented radially and they open up into the interstices (10) between the radial seals (9). It may also be one in which each radial seal (9) has a static seal, which is made of elastomeric material and lies firmly against the container hub (5), and a dynamic seal (17), which is made of a PTFE compound and lies against the axle stub (2) so as to slide on it. A further embodiment is one in which the radial seals (9) have metallic support elements (13) that are configured so as to be L-shaped and that consist of an annular portion (15) that supports the static seal (14), and of an integrally adjoining, disk-shaped flange (16) that supports the dynamic seal. It may also be one in which the radial seals (9) have axially projecting ring segments (24) that grasp below the static seal (14) on file annular portion (15) of the adjacent radial seal (9) and that can be inserted into the annular portion (15) with a positive fit or with a press fit.

The scaling arrangement may be one in which the disk-shaped flange (16) of the support element (13) is also sheathed by the elastomeric material that is used for the static seal (14). It may also be one in which the dynamic seal (9) is glued onto the elastomeric material that is used for the static seal (14). It may also be one in which the static seal (14) covers the annular portion (15) on its radially inner surface, wherein the covering is provided with flow channels (20) that are distributed at regular intervals along its circumference and that open up into round channels (21) created on the outer surface of the static seal (14) and surrounding the radial seal (9). Yet another embodiment is one in which the round channels (21) are formed by recesses (22, 23) made on parts of the outer surfaces that adjoin each other. It may also be one in which the axle stub (2) has a central passage (4), preferably wherein the inflow hole (6) or inflow holes (6) are created in the wall (12) of the axle stub (2).

While the invention has been described with reference to particular embodiments thereof, it will be understood by those having ordinary skill in the art that various changes may be made therein without departing from the scope and spirit of the invention. Further, the present invention is not limited to the embodiments described herein; reference should be had to the appended claims.

The invention claimed is:

1. A sealing arrangement, comprising:

a stationary axle stub configured to suit a drive shaft;

a container including a hub rotatably surrounding the axle stub; and a sealing module comprising a plurality of adjacent radial seals, wherein the container is connected to the drive shaft and configured to be filled with a fluid, wherein the axle stub comprises (i) a central passage oriented in an axial direction, (ii) an axial inflow hole, and (iii) inner openings, which inner openings adjoin the axial inflow hole outwardly and are oriented in a radial direction, wherein the hub of the container comprises an equal number of outer openings, which are in a radial direction and correspond pair-wise to the inner openings of the axle stub, wherein each individually corresponding pair of the inner and outer openings is separated axially from an adjacent pair of the inner and outer openings by one of the adjacent radial seals, wherein an interior of the axle stub is in fluid communication with an interior of the container, and wherein each adjacent radial seal is oriented in the same axial direction.

2. The sealing arrangement of claim 1, wherein the axial inflow hole is configured as a blind hole.

3. The sealing arrangement of claim 1, wherein the inner openings extend in the radial direction of the axle stub, and wherein the inner openings extend to an interstice between to of the plurality of adjacent radial seals.

4. The sealing arrangement of claim 1, wherein each radial seal includes a static seal and a dynamic seal, wherein the static seal comprises an elastomeric material and is disposed firmly against the hub, and wherein the dynamic seal comprises a polytetrafluoroethylene compound and is disposed slidably against the axle stub.

5. The sealing arrangement of claim 4, wherein the dynamic seal is disposed on the elastomeric material of the static seal using an adhesive.

6. The sealing arrangement of claim 4, wherein each radial seal includes an L-shaped metallic support element comprising an annular portion configured to support the static seal, and a disk-shaped flange, integrally adjoined with the annular portion, and configured to support the dynamic seal.

7. The sealing arrangement of claim 6, wherein each radial seal includes an axially projecting ring segment, wherein the axially projecting ring segment extends below the static seal on the annular portion in the axial direction opposite a base of the container, and wherein the axially projecting ring segment is insertable into the annular portion of an adjacent radial seal with at least one of a positive fit and a press fit.

8. The sealing arrangement of claim 7, wherein the axially projecting ring segment comprises a positive fit with the annular portion of the adjacent radial seal.

9. The sealing arrangement of claim 7, wherein the axially projecting ring segment comprises a press fit with the annular portion of the adjacent radial seal.

10. The sealing arrangement of claim 7, comprising a plurality of axially projecting ring segments, wherein the plurality comprises a first axially projecting ring segment comprising a positive fit with the annular portion of an adjacent one of the radial seals, and a second axially projecting ring segment comprising a press fit with the annular portion of the adjacent radial seal.

11. The sealing arrangement of claim 6, wherein the disk-shaped flange of the support element is sheathed by the elastomeric material of the static seal.

12. The sealing arrangement of claim 6, wherein the static seal is disposed on an inner surface of the annular portion of the L-shaped metallic support element, wherein the static seal is oriented in the radial direction, wherein the static seal includes flow channels disposed at regular intervals along a circumference of the static seal, wherein the flow channels extend to round channels surrounding the radial seal, and wherein the round channels are disposed at an outer surface of the static seal in the radial direction.

13. The sealing arrangement of claim 12, wherein the round channels are formed by adjoining recesses on the outer surface of adjacent radial seals.

14. The sealing arrangement of claim 1, wherein the axial inflow hole is disposed within a wall of the axle stub.

15. The sealing arrangement of claim 1, wherein the axle stub comprises more than one axial inflow hole.

16. The sealing arrangement of claim 1, comprising a gap between a base of the container in the axial direction and the axle stub.

17. The sealing arrangement of claim 1, wherein each radial seal has an identical shape.

18. The sealing arrangement of claim 1, configured such that a fluid can be fed into an annular space between the axle stub and the hub, and wherein the annular space is sealed by the radial seals.

19. The sealing arrangement of claim 1, which does not comprise a lubricant.

20. The sealing arrangement of claim 1, wherein each adjacent radial seal is oriented toward a base of the container.

* * * * *